(12) United States Patent
Miyashita

(10) Patent No.: US 7,178,327 B2
(45) Date of Patent: Feb. 20, 2007

(54) INTERNAL COMBUSTION ENGINE AND CONTROL METHOD THEREOF

(75) Inventor: Shigeki Miyashita, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 218 days.

(21) Appl. No.: 10/976,989

(22) Filed: Nov. 1, 2004

(65) Prior Publication Data

US 2005/0097888 A1     May 12, 2005

(30) Foreign Application Priority Data

Nov. 11, 2003    (JP) ............................. 2003-381730

(51) Int. Cl.
    *F01N 3/00*       (2006.01)
(52) U.S. Cl. ............................. 60/285; 60/274; 60/280; 60/284; 60/299
(58) Field of Classification Search ................ 60/274, 60/280, 284, 285, 286, 303, 605.1, 611; 123/90.15, 123/90.16
See application file for complete search history.

(56) References Cited

U.S. PATENT DOCUMENTS

| | | | | |
|---|---|---|---|---|
| 4,235,076 | A * | 11/1980 | Meloche et al. ............... | 60/602 |
| 5,709,081 | A * | 1/1998 | Bruestle ....................... | 60/274 |
| 6,568,173 | B1 * | 5/2003 | Kolmanovsky et al. ....... | 60/280 |
| 6,574,961 | B2 * | 6/2003 | Shiraishi et al. .............. | 60/602 |
| 6,637,406 | B2 | 10/2003 | Yamada et al. | |
| 6,758,037 | B2 * | 7/2004 | Terada et al. .................. | 60/284 |
| 6,837,039 | B2 * | 1/2005 | Schenk et al. ................. | 60/284 |
| 2003/0051466 | A1 | 3/2003 | Baeuerle et al. | |
| 2004/0000136 | A1 * | 1/2004 | Miura .......................... | 60/284 |
| 2006/0112680 | A1 | 6/2006 | Beer et al. | |

FOREIGN PATENT DOCUMENTS

| | | |
|---|---|---|
| DE | 101 40 120 A1 | 3/2003 |
| DE | 102 17 589 A1 | 11/2003 |
| EP | 1 179 676 A1 | 2/2002 |
| JP | A 4-183945 | 6/1992 |
| JP | A 8-296485 | 11/1996 |
| JP | A 2001-304016 | 10/2001 |
| JP | A 2002-48035 | 2/2002 |
| WO | WO 2004/055347 A1 | 7/2004 |

* cited by examiner

*Primary Examiner*—Thomas Denion
*Assistant Examiner*—Diem Tran
(74) *Attorney, Agent, or Firm*—Oliff & Berridge, PLC

(57) ABSTRACT

An internal combustion engine in which power is generated by burning a mixture of fuel supplied from a port injector and/or an in-cylinder injector and air in a combustion chamber, includes a valve drive mechanism which can change a valve opening characteristic of at least one of an intake valve and an exhaust valve; a turbocharger which supercharges air taken into the combustion chamber; a turbo motor which changes supercharging pressure generated by the turbocharger; a catalyst device including a catalyst which purifies exhaust gas discharged from the combustion chamber; and an ECU which controls the turbo motor such that pressure of the air taken into the combustion chamber becomes larger than back pressure until it is determined that the catalyst has been activated, and which sets a valve overlap period during which both of the intake valve and the exhaust valve are opened.

6 Claims, 4 Drawing Sheets

INTERNAL COMBUSTION ENGINE AND CONTROL METHOD THEREOF

INCORPORATION BY REFERENCE

The disclosure of Japanese Patent Application No. 2003-381730 filed on Nov. 11, 2003 including the specification, drawings and abstract is incorporated herein by reference in its entirety.

BACKGROUND OF THE INVENTION

1. Field of the Invention

The invention relates to an internal combustion engine in which power is generated by burning an air-fuel mixture in a combustion chamber, and a control method thereof. More particularly, the invention relates to an internal combustion engine and a control method thereof, which make it possible to activate a catalyst for purifying exhaust gas discharged from a combustion chamber early.

2. Description of the Related Art

Recently, it has become more and more important to reduce exhaust emissions such as HC, for example, immediately after an engine is started in a cold state, since enforcement of the emission control and the like is strengthened. Therefore, as disclosed in Japanese Patent Application Publication No. JP-A-8-296458, an in-cylinder injection internal combustion engine is known, in which a fuel injection valve injects fuel directly into a combustion chamber during an exhaust stroke so that unburned fuel (and air) is burned in a catalyst, whereby the catalyst is activated early. Also, as disclosed in Japanese Patent Application Publication No. JP-A-2001-304016, a technology is known, in which a fuel injection valve injects fuel during an expansion stroke, oxygen that becomes unnecessary during a compression stroke and CO that is generated due to incomplete combustion during the expansion stroke are supplied to a catalyst, and the catalyst is activated using heat of reaction between the oxygen and the CO when the engine is started in a cold state.

As disclosed in Japanese Patent Application Publication No. JP-A-2002-048035, an internal combustion engine with a turbocharger which makes it possible to improve fuel economy and suppress generation of smoke. The internal combustion engine with a turbocharger includes a port injector for injecting fuel into an intake port, and an in-cylinder injector for injecting fuel directly into a combustion chamber. Further, as disclosed in Japanese Patent Application Publication No. JP-A-4-183945, an in-cylinder injection internal combustion engine is known, in which a valve overlap period during which both of an intake valve and an exhaust valve are opened is increased during engine low-load operation so that the amount of high-temperature unburned gas that remains in a combustion chamber is increased, whereby the temperature of an air-fuel mixture is maintained at high temperature before ignition, evaporation of fuel is promoted, a combustion speed is improved, and combustion is stabilized.

However, as described above, even if the fuel is injected directly into the combustion chamber during the exhaust stroke or the compression stroke, it is difficult to reliably supply the catalyst with air of an amount necessary for activating (warming) the catalyst. Thus, the internal combustion engine needs to be further improved in order to reduce exhaust emissions, for example, immediately after the engine is started in the cold state.

SUMMARY OF THE INVENTION

It is an object of the invention to provide an internal combustion engine and a control method thereof, which make it possible to reliably activate a catalyst early, and to suitably reduce exhaust emissions.

A first aspect of the invention relates to an internal combustion engine in which power is generated by burning a mixture of fuel supplied from a fuel injection device and air in a combustion chamber continuous with an intake port that is opened/closed by an intake valve and an exhaust port that is opened/closed by an exhaust valve. The internal combustion engine includes a valve opening characteristic setting device which changes a valve opening characteristic of at least one of the intake valve and the exhaust valve; a turbocharger which supercharges air taken into the combustion chamber; a supercharging pressure setting device which changes supercharging pressure generated by the turbocharger; a catalyst which purifies exhaust gas discharged from the combustion chamber; and a controller which controls the supercharging pressure setting device such that pressure of the air taken into the combustion chamber becomes larger than back pressure until it is determined that the catalyst has been activated, and which sets a valve overlap period during which both of the intake valve and the exhaust valve are opened.

According to the first aspect of the invention, the internal combustion engine includes the supercharging pressure setting device which changes the supercharging pressure generated by the turbocharger, and the valve opening characteristic setting device which changes the valve opening characteristic of at least one of the intake valve and the exhaust valve. In the internal combustion engine, the valve overlap period during which both of the intake valve and the exhaust valve are opened is set while the pressure of the air taken into the combustion chamber is set to a value larger than the back pressure until it is determined that the catalyst has been activated, for example, immediately after the engine is started. Thus, so-called blow-by from the intake port to the exhaust port is reliably promoted, and a sufficient amount of air (oxygen) can be delivered to the catalyst together with unburned fuel. As a result, in the internal combustion engine, so-called after-burning in the catalyst and an exhaust pipe can be promoted, and the temperature of exhaust gas can be increased. Therefore, the catalyst can be activated early, and the exhaust emissions can be suitably reduced.

In the first aspect of the invention, the turbocharger may include a motor which is the supercharging pressure setting device, and which rotates a compressor element.

In the first aspect of the invention, the fuel injection device may be an in-cylinder injector for injecting the fuel directly into the combustion chamber. With the configuration, the catalyst of an in-cylinder injection internal combustion engine can be activated early.

In the first aspect of the invention, the controller may cause the in-cylinder injector to inject the fuel also during an exhaust stroke until it is determined that the catalyst has been activated. With the configuration, since the in-cylinder injector injects the fuel also during the exhaust stroke in addition to normal fuel injection (in-cylinder injection), the temperature of exhaust gas discharged from the combustion chamber can be increased by promoting combustion in the combustion chamber, and a sufficient amount of air (oxygen) can be delivered to the catalyst together with unburned fuel.

In the first aspect of the invention, the fuel injection device may be a port injector for injecting the fuel into the intake port. With the configuration, the catalyst of a port injection internal combustion engine can be also activated early. In this case, the controller may set an air-fuel ratio of the mixture in the intake port to a lean air-fuel ratio until it is determined that the catalyst has been activated.

With the aforementioned configuration, since air and the fuel supplied from the fuel injection device are uniformly mixed at the intake port, blow-by of the uniform and lean mixture from the intake port toward the exhaust port is promoted. Thus, in the internal combustion engine, the catalyst can be efficiently activated by delivering a sufficient amount of air (oxygen) to the catalyst together with unburned fuel, and promoting so-called after-burning.

In the first aspect of the invention, the fuel injection device may include a port injector for injecting the fuel into the intake port, and an in-cylinder injector for injecting the fuel directly into the combustion chamber. Also, the controller may cause the port injector to inject the fuel such that an air-fuel ratio of the mixture in the intake port (and the exhaust port) becomes lean and may cause the in-cylinder injector to inject the fuel until it is determined that the catalyst has been activated. With the configuration, the temperature of exhaust gas can be increased by delivering a sufficient amount of air (oxygen) to the catalyst together with unburned fuel. Accordingly, the catalyst can be activated early, and exhaust emissions can be suitably reduced.

In the first aspect of the invention, the controller may cause the in-cylinder injector to inject the fuel also during an exhaust stroke until it is determined that the catalyst has been activated.

A second aspect of the invention relates to a control method for an internal combustion engine including a combustion chamber continuous with an intake port that is opened/closed by an intake valve and an exhaust port that is opened/closed by an exhaust valve; a valve opening characteristic setting device which changes a valve opening characteristic of at least one of the intake valve and the exhaust valve; a turbocharger which can change a supercharging pressure; and a catalyst which purifies exhaust gas discharged from the combustion chamber, wherein power is generated by burning a mixture of fuel supplied from a fuel injection device and air in the combustion chamber. The control method includes the steps of setting pressure of air supercharged by the turbocharger and taken into the combustion chamber to a value larger than back pressure until it is determined that the catalyst has been activated; and setting a valve overlap period during which both of the intake valve and the exhaust valve are opened.

According to the invention, it is possible to provide the internal combustion engine and control method thereof, which makes it possible to reliably activate the catalyst early and to suitably reduce exhaust emissions.

A third aspect of the invention relates to an internal combustion engine in which power is generated by burning a mixture of fuel supplied from fuel injection means and air in a combustion chamber continuous with an intake port that is opened/closed by an intake valve and an exhaust port that is opened/closed by an exhaust valve. The internal combustion engine includes valve opening characteristic setting means for changing a valve opening characteristic of at least one of the intake valve and the exhaust valve; a turbocharger for supercharging air taken into the combustion chamber; supercharging pressure setting means for supercharging pressure generated by the turbocharger; a catalyst for purifying exhaust gas discharged from the combustion chamber; and control means for controlling the supercharging pressure setting means such that pressure of the air taken into the combustion chamber becomes larger than back pressure until it is determined that the catalyst has been activated, and setting a valve overlap period during which both of the intake valve and the exhaust valve are opened.

A fourth aspect of the invention relates to a control method for an internal combustion engine including a combustion chamber continuous with an intake port that is opened/closed by an intake valve and an exhaust port that is opened/closed by an exhaust valve; valve opening characteristic setting means for changing a valve opening characteristic of at least one of the intake valve and the exhaust valve; a turbocharger which can change a supercharging pressure; and a catalyst for purifying exhaust gas discharged from the combustion chamber, wherein power is generated by burning a mixture of fuel supplied from fuel injection means and air in the combustion chamber. The control method includes the steps of setting pressure of air supercharged by the turbocharger and taken into the combustion chamber becomes larger than back pressure until it is determined that the catalyst has been activated; and setting a valve overlap period during which both of the intake valve and the exhaust valve are opened.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, an exemplary embodiment of the invention will be described with reference to accompanying drawings.

Figure 1:
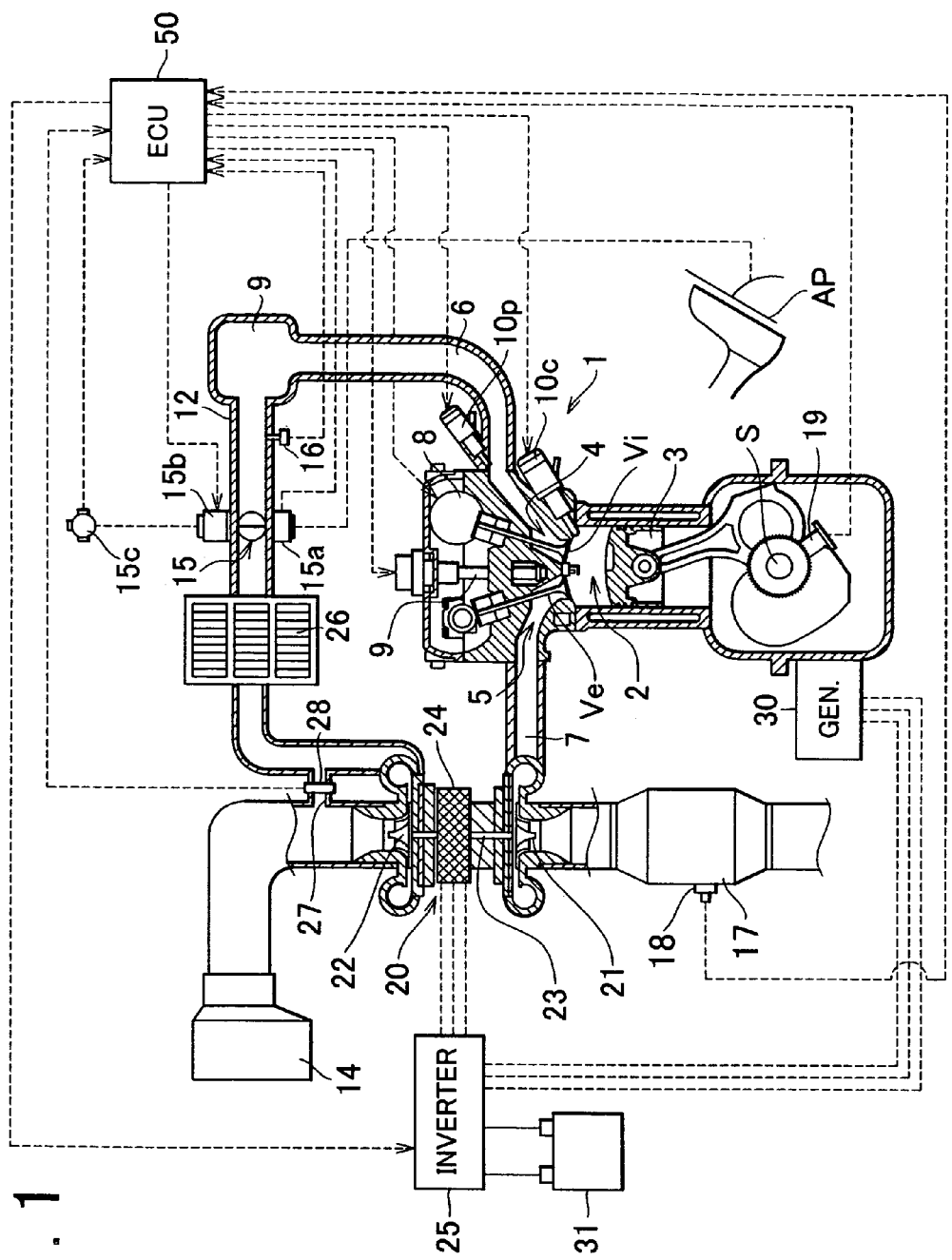
FIG. 1 is a schematic diagram showing a configuration of an internal combustion engine according to the invention.

FIG. 1 is a schematic diagram showing an internal combustion engine according to the invention. An internal combustion engine 1 shown in FIG. 1 is configured as a multi-cylinder internal combustion engine for a vehicle (for example, a four-cylinder internal combustion engine. However, FIG. 1 shows only one cylinder). A piston 3 is reciprocated using combustion of an air-fuel mixture in each combustion chamber 2, whereby power is obtained from a crank shaft S. In the embodiment, the internal combustion engine 1 is described as a so-called gasoline engine. However, the invention is not limited to the gasoline engine. It is apparent that the invention can be applied to a diesel engine.

As shown in FIG. 1, each intake port 4 that is continuous with each combustion chamber 2 is connected to an intake pipe 6 via an intake manifold. Each exhaust port 5 that is continuous with each combustion chamber 2 is connected to an exhaust pipe 7 via an exhaust manifold. Also, in a cylinder head of the internal combustion engine 1, an intake valve Vi for opening/closing the intake port 4 and an exhaust valve Ve for opening/closing the exhaust port 5 are provided for each combustion chamber 2. Each intake valve Vi and each exhaust valve Ve are opened/closed by a valve drive mechanism 8. This valve drive mechanism 8 includes a variable valve timing mechanism (valve opening characteristic setting means) which can change the valve opening characteristic of at least one of the intake valve Vi and the exhaust valve Ve. Further, the internal combustion engine 1 includes ignition plugs 9 whose number corresponds to the number of cylinders. Each ignition plug 9 is provided in the cylinder head so as to be opposed to the corresponding combustion chamber 2.

Also, the internal combustion engine 1 includes in-cylinder injectors 10c whose number corresponds to the number of cylinders. Each in-cylinder injector 10c can inject fuel such as gasoline directly into each combustion chamber 2. Each in-cylinder injector 10c is connected to a fuel tank (not shown) for storing liquid fuel such as gasoline via a fuel supply pipe (not shown). In addition, the internal combustion engine 1 includes port injectors 10p whose number corresponds to the number of cylinders, as shown in FIG. 1. Each port injector 10p can inject the fuel such as gasoline into the corresponding intake port 4. Each port injector 10p is connected to the fuel tank (not shown) for storing the liquid fuel such as gasoline via the fuel supply pipe (not shown). At least one in-cylinder injector 10c is provided for each combustion chamber 2. At least one port injector 10p is provided for each intake port 4.

Each piston 3 of the internal combustion engine 1 is configured such that a concave portion having a so-called deep dish shape is formed at the top face thereof. In the internal combustion engine 1, each in-cylinder injector 10c can inject the fuel such as gasoline directly toward the concave portion of the piston 3 in each combustion chamber 2 with air being taken into each combustion chamber 2. Thus, in the internal combustion engine 1, a layer of an air-fuel mixture is formed in the vicinity of the ignition plug 9 such that the layer of the air-fuel mixture is separated from an air layer therearound (i.e., the air-fuel mixture is stratified). Therefore, it is possible to stably perform stratified charge combustion using an extremely lean mixture.

Meanwhile, the intake pipe 6 is connected to a surge tank 11, as shown in FIG. 1. The surge tank 11 is connected to an air cleaner 14 via an air supply pipe 12. Dust, dirt, and the like in the intake air are removed using the air cleaner 14. Also, a throttle valve 15 for adjusting an intake air amount is provided at a certain position in the air supply pipe 12. In the embodiment, as the throttle valve 15, an electronically controlled throttle valve is employed. The electronically controlled throttle valve 15 includes an accelerator position sensor 15a for detecting an operation amount (depression amount) of an accelerator pedal AP, a throttle motor 15b for opening/closing the throttle valve 15, and a throttle valve opening amount sensor 15c for detecting the opening amount of the throttle valve 15. Further, a pressure sensor 16 for detecting the pressure (intake air pressure) in the air supply pipe 12 is provided between the surge tank 11 and the throttle valve 15 in the air supply pipe 12.

Also, the exhaust pipe 7 is connected to a catalyst device 17 including, for example, a NOx storage reduction catalyst, as shown in FIG. 1. In the catalyst device 17, exhaust gas discharged from each combustion chamber 2 is purified. A temperature sensor 18 for detecting a catalyst bed temperature is provided in the catalyst device 17. The internal combustion engine 1 may include an EGR (exhaust gas recirculation) passage through which exhaust gas flows back to the surge tank 11 of an intake air system from the exhaust pipe 7. In this case, an EGR valve for adjusting the amount of exhaust gas flowing back to the surge tank 11 is provided in the EGR passage.

The aforementioned internal combustion engine 1 further includes a turbocharger 20 in order to obtain high output and high fuel efficiency by introducing more intake air into each combustion chamber 2, and performing lean-burn operation. The turbocharger 20 includes a turbine impeller (turbine element) 21 and a compressor impeller (compressor element) 22, as shown in FIG. 1. The turbine impeller 21 and the compressor impeller 22 are connected and integrated with each other by a rotation shaft 23.

As shown in FIG. 1, the turbine impeller 21 is provided so as to be rotatable in a casing incorporated between the exhaust pipe 7 and the catalyst device 17. Also, the compressor impeller 22 is provided so as to be rotatable in a casing incorporated between the air cleaner 14 and the throttle valve 15. Since the turbine impeller 21 is rotated by exhaust gas discharged from each combustion chamber 2, the compressor impeller 22 can be rotated. Thus, air that is taken via the air cleaner 14 can be compressed (supercharged) by the compressor impeller 22.

Also, the turbocharger 20 of the internal combustion engine 1 is configured as a so-called motor-assist turbocharger. The turbocharger 20 includes a turbo motor 24 (supercharging pressure setting means) that is provided on the rotation shaft 23 which connects the turbine impeller 21 and the compressor impeller 22. That is, the turbocharger 20 can function as a typical turbocharger which compresses the intake air using only energy of the exhaust gas of the internal combustion engine 1. Also, the turbocharger 20 can further increase the pressure of the intake air (supercharging pressure) by operating the turbo motor 24 so as to forcibly rotate the compressor impeller 22.

As the turbo motor 24, an alternating current motor, which includes a rotor fixed on the rotation shaft 23 and a stator disposed around the rotor, is employed. As shown in FIG. 1, the turbo motor 24 is connected to an inverter unit 25. As the turbo motor 24, a so-called motor-generator which can function as both of a motor and a generator.

With the configuration, electric energy can be recovered by operating the turbo motor 24 as the generator using the energy of exhaust gas.

Also, the internal combustion engine 1 includes an inter-cooler 26 incorporated in the air supply pipe 12 so as to be positioned between the compressor impeller 22 and the throttle valve 15. The inter-cooler 26 cools the intake air whose temperature has been increased due to compression by the compressor impeller 22, whereby charging efficiency is improved. As the inter-cooler 26, for example, an air-cooled or liquid-cooled heat exchanger is employed. Further, a bypass passage 27 that connects an upstream side and a downstream side of the turbocharger 20 (compressor impeller 22) is provided in the air supply pipe 12. The bypass passage 27 is opened/closed by an air bypass valve 28 that is provided at a certain position in the bypass passage 27. As an air bypass valve 28, a valve which can be electrically opened/closed may be used. Alternatively, a mechanical one-way valve may be used, which is opened only when the pressure on the downstream side of the compressor impeller 22 becomes higher than the pressure on the upstream side of the compressor impeller 22 by a predetermined value.

The turbocharger 20 in the embodiment is configured as a so-called variable nozzle turbocharger. The turbocharger 20 includes plural movable vanes (not shown) disposed outside of the turbine impeller 21. That is, the flow amount of exhaust gas flowing into the turbine impeller 21 is controlled by changing the positions of these movable vanes, whereby the supercharging pressure can be freely adjusted. Also, the turbocharger 20 may include a mechanism which performs a variable control of a turbine capacity (A/R variable mechanism) and the like. Further, a passage (not shown) which bypasses the turbocharger 20 is provided for the exhaust pipe 7. A waste gate valve is provided at a certain position in the passage. The waste gate valve is opened when the supercharging pressure becomes equal to or higher than a predetermined pressure so as to adjust the supercharging pressure by decreasing the flow amount of exhaust gas flowing to the turbine impeller 21.

The internal combustion engine 1 includes a regenerative generator 30 connected to the crank shaft S, in addition to the aforementioned turbocharger 20, as shown in FIG. 1. The regenerative generator 30 can function as a regenerative brake unit which is operated in coordination with a hydraulic brake unit (not shown). The regenerative generator is connected to a battery 31 which is used as a power source for various auxiliary machines, via an inverter unit 25. That is, when the accelerator pedal AP is returned, or when a command for decelerating or stopping the internal combustion engine 1 (vehicle) is issued, the regenerative generator 30 converts kinetic energy of the internal combustion engine 1 to electric energy, and recovers the electric energy, thereby applying braking force to the internal combustion engine 1. The voltage of the electric power regenerated by the regenerative generator 30 is changed by the inverter unit 25, and then, the electric power is used for charging the battery 31.

The braking force generated by the regenerative generator 30 (regenerative brake) and the braking force generated by the hydraulic brake unit are appropriately combined such that energy is recovered most efficiently. Also, as the regenerative generator 30, the so-called motor-generator which can function as both of the motor and the generator may be employed. Thus, a vehicle including the aforementioned internal combustion engine 1 and the turbocharger 20 may be configured as a so-called hybrid vehicle.

The aforementioned internal combustion engine 1 includes an electric control unit (hereinafter, referred to as "ECU") 50 which functions as control means. The ECU 50 includes a CPU, ROM, RAM, input/output ports, and a storage device for storing various information, maps, and the like. The input/output ports of the ECU 50 are connected to the aforementioned valve drive mechanism 8, the injectors 10*c* and 10*p*, the accelerator position sensor 15*a*, the throttle motor 15*b*, the throttle valve opening amount sensor 15*c*, the pressure sensor 16, the temperature sensor 18, a crank angle sensor 19, the inverter unit 25, the air bypass valve 28, and the like. The ECU 50 controls the valve drive mechanism 8, the ignition plugs 9, the injectors 10*c* and 10*p*, the throttle valve 15, and the like, based on detection values of the various sensors, and the like, using the various maps stored in the storage device. Also, the ECU 50 functions as the control means for the turbocharger 20 (turbo motor 24) when the brake is applied to the internal combustion engine 1.

Recently, it has become more and more important to reduce exhaust emissions such as HC, for example, immediately after an engine is started in a cold state, since enforcement of the emission control and the like is strengthened. Therefore, in the aforementioned internal combustion engine 1, the catalyst of the catalyst device 17 is activated early according to a control procedure shown in FIG. 2 in order to reduce exhaust emission immediately after the engine is started.

Hereinafter, the control procedure for the internal combustion engine 1 shown in FIG. 2 will be described. In this case, when the ignition switch is turned on and the internal combustion engine 1 is started, the ECU 50 obtains an engine rotational speed based on a signal from the crank angle sensor 19, and determines whether the obtained engine rotational speed is higher than a predetermined threshold value. Then, when the engine rotational speed becomes higher than the predetermined threshold value, the ECU 50 determines that start of the internal combustion engine 1 has been completed (S10). When the ECU 50 determines that the start of the internal combustion engine 1 has been completed, the ECU 50 operates the turbo motor 24 for the turbocharger 20, and sets a valve overlap period during which both of the intake valve Vi and the exhaust valve Ve for each combustion chamber 2 are opened (S12).

More specifically, in step S12, the ECU 50 gives a predetermined command signal to the inverter unit 25 connected to the turbo motor 24 such that the intake air pressure detected by the pressure sensor 16, that is, the pressure of the air that has been supercharged by the turbocharger 20 to be taken into each combustion chamber 2 becomes higher than back pressure inherent in the internal combustion engine 1 (exhaust back pressure) that is obtained in advance. In the embodiment, the turbo motor 24 is controlled such that the intake air pressure becomes higher than the back pressure, for example, by approximately 10 to 30 kPa. At substantially the same time, the ECU 50 sets the overlap period, that is, the period during which both of the intake valve Vi and the exhaust valve Ve are opened, according to a map that is made in advance, and gives a predetermined command signal to the valve drive mechanism 8 including the variable valve timing mechanism.

After the process in step S12 is performed, the ECU 50 decides the fuel injection amount of each port injector 10*p* (S14). More specifically, in step S14, the ECU 50 sets the valve opening period of each port injector 10*p* such that the air-fuel ratio A/Fp of the air-fuel mixture in each intake port 4 becomes, for example, approximately 30 (i.e., A/Fp=30), based on the intake air pressure that is set in step S12 and the like, according to the map that is made in advance. Then, the ECU 50 gives a predetermined command signal to each port injector 10*p*.

After the process in step S14 is performed, the ECU 50 further decides the fuel injection amount of each in-cylinder injector (S16). More specifically, in step 16, the ECU 50 decides the valve opening period of each in-cylinder injector 10*c* such that the air-fuel ratio A/Fc of the air-fuel mixture in each combustion chamber 2 becomes, for example, approximately 14 (A/Fc=14), based on the intake air pressure that is set in step S12, the overlap period during which both of the intake valve Vi and the exhaust vale Ve are opened that is set in step S12, that is, a blow-by amount of the lean air-fuel mixture (A/Fp=30) that blows from the intake port 4 to the exhaust port 5 due to the valve overlap, and the like, according to the map that is made in advance, and the like. Then, the ECU 50 gives a predetermined command signal to each in-cylinder injector 10*c*.

Further, after the process in step S16 is performed, the ECU 50 decides the amount of the fuel to be injected from each in-cylinder injector 10*c* during the exhaust stroke of the internal combustion engine 1 (step S18). More specifically, in step S18, the ECU 50 decides the valve opening period and the valve opening timing of each in-cylinder injector 10*c* such that the air-fuel ratio A/Fe of the air-fuel mixture in each exhaust port 5 becomes, for example, approximately 16 (A/Fe=16), based on the intake air pressure that is set in step S12, the overlap period during which both of the intake valve Vi and the exhaust vale Ve are opened (the blow-by amount of the lean air-fuel mixture that blows from the intake port 4 to the exhaust port 5) that is set in step S12, the fuel injection amount of each port injector 10p and the fuel injection amount of each in-cylinder injector 10c, and the like, according to the map that is made in advance, and the like. Then, the ECU 50 gives a predetermined command signal to each in-cylinder injector 10c.

Thus, when the process in step S18 has been completed, each port injector 10p injects the fuel into each intake port (i.e., performs synchronous injection) such that the air-fuel ratio of the air-fuel mixture in each intake port 4 becomes lean (in this case, A/Fp=30), that is, the air-fuel ratio becomes larger than a stoichiometric air-fuel ratio. In addition, each in-cylinder injector 10c injects the fuel into each combustion chamber 2 (i.e., performs synchronous injection). Further, each in-cylinder injector 10c injects the fuel into each combustion chamber 2 (i.e., performs non-synchronous injection) also during the exhaust stroke. As a result, the air-fuel ratio A/Fe of the air-fuel mixture in each exhaust port 5 is maintained at approximately 16 at which burning of the air-fuel mixture can be promoted easily. That is, in the internal combustion engine 1, the intake air pressure and the overlap period are set in step S12, the air-fuel ratio A/Fp in each intake port 4 is set in step S14, the air-fuel ratio A/Fc in each combustion chamber 2 is set in step S16, and the fuel injection amount during the exhaust stroke is set in step S18 such that the air-fuel ratio A/Fe of the air-fuel mixture in each exhaust port 5 becomes approximately 16 finally.

After the process in step S18 is performed, the ECU 50 obtains the catalyst bed temperature of the catalyst device 17 based on a signal from the temperature sensor 18 in the catalyst device 17, and determines whether the obtained catalyst bed temperature is higher than the predetermined threshold value (S20). In step S20, when the ECU 50 determines that the obtained catalyst bed temperature is higher than the predetermined threshold value, the ECU 50 determines that the catalyst of the catalyst device 17 has been fully activated. In this case, the ECU 50 terminates a series of processes in FIG. 2, and starts a control for the internal combustion engine 1 that is performed during normal operation. Meanwhile, when the ECU 50 determines that the catalyst bed temperature is equal to or lower than the predetermined threshold value in step S20, the ECU 50 determines that the catalyst of the catalyst device 17 has not been fully activated, and repeatedly performs the aforementioned processes in step S12 to step S18.

As described above, in the internal combustion engine 1, the overlap period during which both of the intake valve Vi and the exhaust valve Ve are opened is set while the pressure of the air taken into each combustion chamber 2 (intake air pressure) is set to a value larger than the back pressure until it is determined that the catalyst of the catalyst device 17 has been activated in step S20 immediately after the engine is started. Thus, it is possible to reliably promote blow-by of the lean air-fuel mixture (A/Fp=30), which is generated by uniformly mixing the air and the fuel in each intake port 4, from the intake port 4 to the exhaust port 5. Therefore, a sufficient amount of air (oxygen) can be delivered to the catalyst together with unburned fuel. Accordingly, in the internal combustion engine 1, after-burning in the catalyst device 17 can be promoted, and the catalyst can be activated efficiently.

Also, in the internal combustion engine 1, in addition to the fuel injection to each intake port 4 (S14), each in-cylinder injector 10c injects the fuel into each combustion chamber 2 (S16). As a result, the air-fuel ratio of the air-fuel mixture inside each combustion chamber 2 becomes relatively rich (A/Fc=14), that is, the air-fuel ratio becomes smaller than the stoichiometric air-fuel ratio. Therefore, combustion in each combustion chamber 2 is stably performed, and the combustion is performed with the air-fuel ratio of the air-fuel mixture being in the vicinity of the stoichiometric air-fuel ratio. Thus, the temperature of exhaust gas can be increased. Further, in the internal combustion engine 1, each in-cylinder injector 10c injects the fuel also during the exhaust stroke (S18) until it is determined that the catalyst of the catalyst device 17 has been activated in step S20. Thus, in addition to the normal fuel injection (port injection and in-cylinder injection), the in-cylinder injector 10c injects the fuel also during the exhaust stroke, whereby a sufficient amount of air (oxygen) can be delivered to the catalyst together with unburned fuel.

As a result, after-burning of the fuel in the catalyst of the catalyst device 17 and the exhaust pipe 7 can be promoted, and the temperature of exhaust gas can be increased in the internal combustion engine 1. Therefore, the catalyst can be activated rapidly immediately after the engine is started, and exhaust emissions can be suitably reduced. Also, in the internal combustion engine 1, blow-by from the intake port 4 to the exhaust port 5 is caused by effectively using the turbocharger 20 that is the so-called motor-assist turbo charger, whereby unburned fuel and a sufficient amount of air can be delivered to the catalyst. Therefore, an air pump and the like which are conventionally used for supplying secondary air to the catalyst in order to activate the catalyst become unnecessary.

In the internal combustion engine 1 including the turbocharger 20, since exhaust gas discharged from each combustion chamber 2 passes through the turbocharger 20 before flowing into the catalyst device 17, the temperature of exhaust gas is decreased to a certain degree due to heat capacity of the turbocharger 20, that is, heat capacity of the turbine impeller 21 and the compressor impeller 22. However, if a difference between the intake air pressure set in step S12 and the back pressure is made sufficiently large, the influence of heat loss of the exhaust gas at the turbocharger 20 on activation of the catalyst is substantially negligible.

Figure 2:
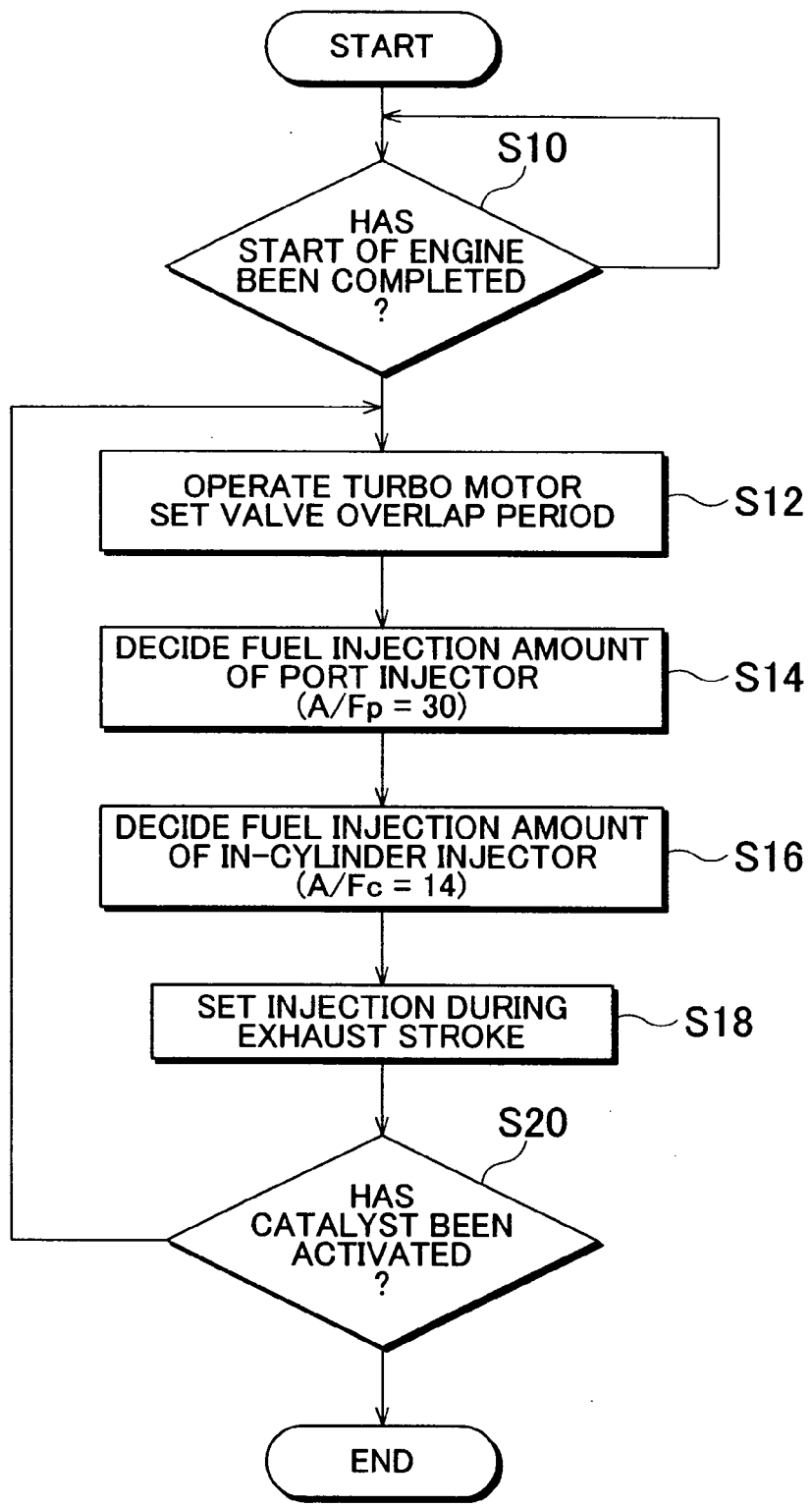
FIG. 2 is a flow chart explaining operation of the internal combustion engine shown in FIG. 2.

In the control procedure shown in FIG. 2, in addition to the normal port injection and the normal in-cylinder injection, each in-cylinder injector 10c injects the fuel into each combustion chamber 2 during the exhaust stroke in step S18. However, the fuel injection during the exhaust stroke in step S18 may be omitted. In the case where the fuel injection during the exhaust stroke is omitted, the air-fuel ratio A/Fp in each intake port 4 is set to, for example, approximately 22 (A/Fp=22) in step S14, the air-fuel ratio A/Fc in each combustion chamber 2 is set to, for example, approximately 12 (A/Fc=12) in step S16, and the overlap period during which both of the intake valve Vi and the exhaust valve Ve are opened is appropriately set, whereby the air-fuel ratio A/Fe of the air-fuel mixture in each exhaust port 5 can be maintained at approximately 16 at which burning of the air-fuel mixture can be promoted easily. Further, each port injector 10p may perform non-synchronous injection into each intake port 4 such that the air-fuel ratio A/Fe of the air-fuel mixture in each exhaust port 5 is maintained at approximately 16, instead of fuel injection during the exhaust stroke in step S18.

Figure 3:
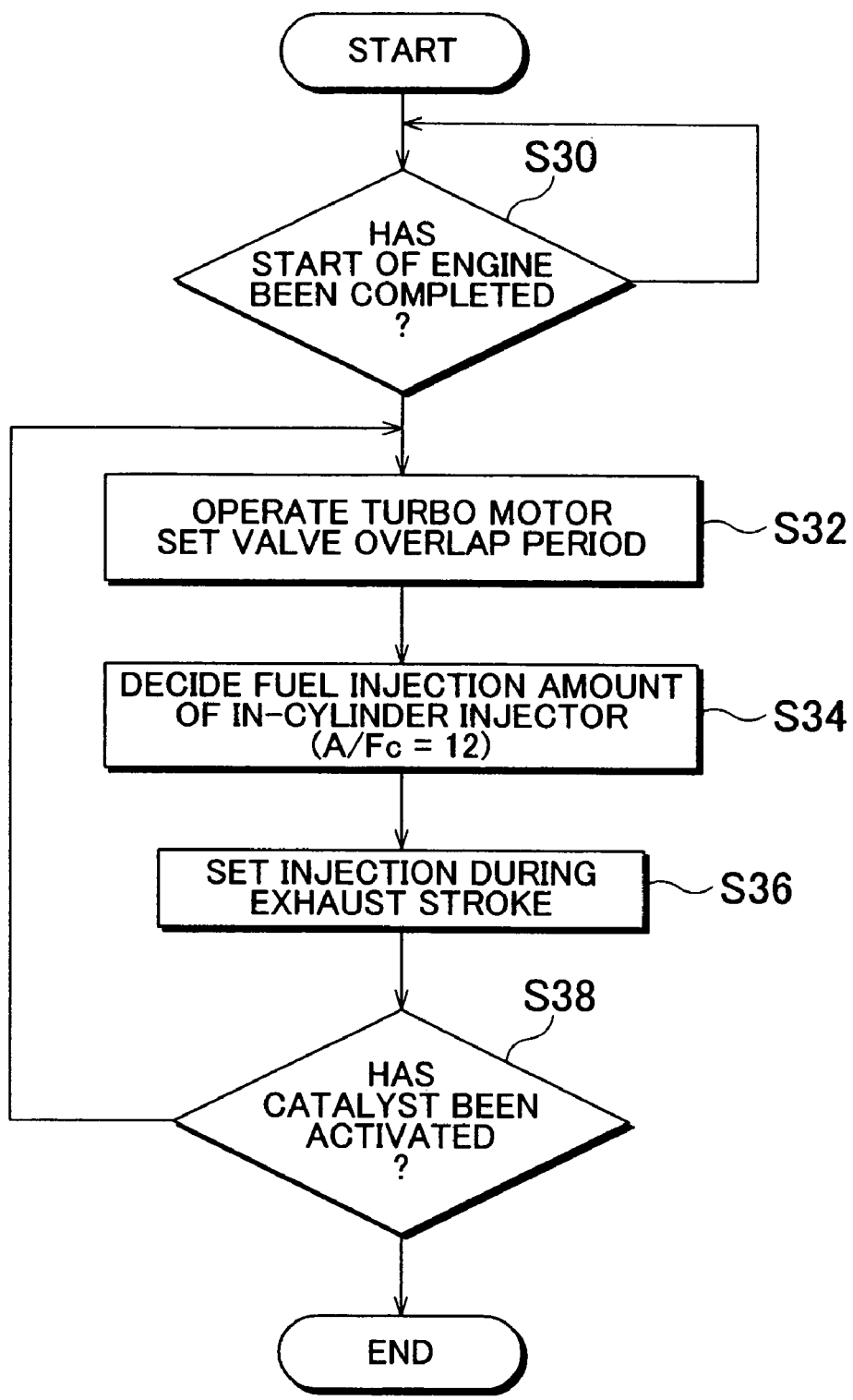
FIG. 3 is a flow chart showing another control procedure that can be performed in the internal combustion engine shown in FIG. 1 in order to reduce exhaust emissions immediately after the engine is started.

FIG. 3 is a flow chart showing another control procedure that can be performed in order to reduce exhaust emissions immediately after the engine is started.

Hereinafter, the control procedure for the internal combustion engine 1 shown in FIG. 3 will be described. In this control procedure as well, when the ignition switch is turned on and the internal combustion engine 1 is started, the ECU 50 obtains the engine rotational speed based on the signal from the crank angle sensor 19, and determines whether the obtained engine rotational speed is higher than the predetermined threshold value. When the engine rotational speed becomes higher than the predetermined threshold value, the ECU 50 determines that the start of the internal combustion engine 1 has been completed (S30). When the ECU 50 determines that the start of the internal combustion engine 1 has been completed, the ECU 50 operates the turbo motor 24 for the turbocharger 20, and sets the valve overlap period during which both of the intake valve Vi and the exhaust valve Ve for each combustion chamber 2 are opened (S32).

In step S32, the ECU 50 gives a predetermined command signal to the inverter unit 25 connected to the turbo motor 24 such that the intake air pressure detected by the pressure sensor 16 becomes higher than the back pressure inherent in the internal combustion engine 1. At substantially the same time, the ECU 50 sets the overlap period during which both of the intake valve Vi and the exhaust valve Ve are opened, according to the map that is made in advance, and the like, and gives a predetermined command signal to the valve drive mechanism 8 including the variable valve timing mechanism.

After the process in step S32 is performed, the ECU 50 decides the fuel injection amount of each in-cylinder injector 10c (S34). More specifically, in step S34, the ECU 50 decides the valve opening period of each in-cylinder injector 10c such that the air-fuel ratio A/Fc of the air-fuel mixture in each combustion chamber 2 becomes, for example, approximately 12 (A/Fc=12), based on the intake air pressure that is set in step S32, the overlap period during which both of the intake valve Vi and the exhaust vale Ve are opened that is set in step S32, that is, the blow-by amount of fresh air that blows from the intake port 4 to the exhaust port 5 due to the valve overlap, and the like, according to the map that is made in advance, and the like. Then, the ECU 50 gives a predetermined command signal to each in-cylinder injector 10c.

Further, after the process in step S34 is performed, the ECU 50 decides the amount of fuel to be injected from each in-cylinder injector 10c during the exhaust stroke of the internal combustion engine 1 (S36). In step S36, the ECU 50 decides the valve opening period and the valve opening timing of each in-cylinder injector 10c such that the air-fuel ratio A/Fe of the air-fuel mixture in each exhaust port 5 becomes, for example, approximately 16 (A/Fe=16), based on the intake air pressure that is set in step S32, the overlap period during which both of the intake valve Vi and the exhaust vale Ve are opened (the blow-by amount of the fresh air) that is set in step S32, the fuel injection amount of each in-cylinder injector 10c that is decided in step S34, and the like, according to the map that is made in advance, and the like. Then, the ECU 50 gives a predetermined command signal to each in-cylinder injector 10c.

Thus, when the process in step S36 has been completed, each in-cylinder injector 10c injects the fuel into each combustion chamber 2 (i.e., performs synchronous injection) such that the air-fuel ratio of the air-fuel mixture in each combustion chamber 2 becomes rich (in this case, A/Fc=12). Further, each in-cylinder injector 10c injects the fuel into each combustion chamber 2 (i.e., performs non-synchronous injection) also during the exhaust stroke. As a result, the air-fuel ratio A/Fe of the air-fuel mixture in each exhaust port 5 is maintained at approximately 16 at which burning of the air-fuel mixture can be promoted easily. That is, in the case where the control procedure shown in FIG. 3 is performed as well, the intake air pressure and the overlap period are set in step S32, the air-fuel ratio A/Fc in each combustion chamber 2 is set in step S34, and the fuel injection amount during the exhaust stroke is set in step S36 such that the air-fuel ratio A/Fe of the air-fuel mixture in each exhaust port 5 becomes approximately 16 finally.

After the process in step S36 is performed, the ECU 50 obtains the catalyst bed temperature based on the signal from the temperature sensor 18 in the catalyst device 17, and determines whether the obtained catalyst bed temperature is higher than the predetermined threshold value (S38). When the ECU 50 determines that the obtained catalyst bed temperature is higher than the predetermined threshold value in step S38, the ECU 50 determines that the catalyst of the catalyst device 17 has been fully activated. In this case, the ECU 50 terminates a series of processes in FIG. 3, and starts the control for the internal combustion engine 1 that is performed during normal operation. Meanwhile, when the ECU 50 determines that the catalyst bed temperature is equal to or lower than the predetermined threshold value in step S38, the ECU 50 determines that the catalyst of the catalyst device 17 has not been fully activated, and repeatedly performs the aforementioned processes in step S32 to step S36.

As described above, in the case where the control procedure shown in FIG. 3 is performed as well, the overlap period during which both of the intake valve Vi and the exhaust valve Ve are opened is set while the pressure of the air taken into each combustion chamber 2 (intake air pressure) is set to a value larger than the back pressure until it is determined that the catalyst of the catalyst device 17 has been activated in step S38 immediately after the engine is started. Also, in the case shown in FIG. 3, each in-cylinder injector 10c injects the fuel into each combustion chamber 2 (i.e., performs synchronous injection) such that the air-fuel ratio of the air-fuel mixture in each combustion chamber 2 becomes rich (A/Fc=12). Thus, blow-by of the fresh air from the intake port 4 to the exhaust port 5 is reliably promoted, and unburned fuel in the combustion chamber 2 is brought to the exhaust port 5 by the flow of the fresh air. Therefore, in the case where the control procedure shown in FIG. 3 is employed as well, a sufficient amount of air (oxygen) can be delivered to the catalyst together with unburned fuel. Accordingly, after-burning in the catalyst device 17 can be promoted, and the catalyst can be activated efficiently.

Also, since the air-fuel ratio of the air-fuel mixture in each combustion chamber 2 becomes relatively rich (A/Fc=12), the combustion is stably performed when the engine is cold, and the ignition timing can be retarded due to stable combustion in each combustion chamber 2. Thus, the temperature of exhaust gas can be increased. Further, since each in-cylinder injector 10c injects the fuel also during the exhaust stroke (S36) until it is determined that the catalyst of the catalyst device 17 has been activated in step S38, a sufficient amount of air (oxygen) can be delivered to the catalyst together with unburned fuel.

As a result, in the case where the control procedure shown in FIG. 3 is employed as well, after-burning of the fuel in the catalyst of the catalyst device 17 can be promoted, and the temperature of exhaust gas can be increased. Therefore, the catalyst can be activated rapidly after the engine is started, and exhaust emissions can be suitably reduced. In this case as well, the air pump and the like which are conventionally used for supplying secondary air to the catalyst in order to activate the catalyst become unnecessary. Further, if a difference between the intake air pressure set in step S32 and the back pressure is made sufficiently large, the influence of heat loss of the exhaust gas at the turbocharger 20 on activation of the catalyst is substantially negligible. Also, in the processes shown in FIG. 3, the fuel injection during the exhaust stroke may be omitted. In the case where the fuel injection during the exhaust stroke is omitted, the overlap period during which both of the intake valve Vi and the exhaust valve Ve are opened is appropriately set, whereby the air-fuel ratio A/Fe of the air-fuel mixture in each exhaust port 5 can be maintained at approximately 16 at which burning of the air-fuel mixture can be promoted easily.

As described above, in the case where the control procedure shown in FIG. 3 is employed, it is possible to obtain substantially the same effects as those obtained in the case where the control procedure shown in FIG. 2 is employed. That is, according to the invention, the catalyst can be activated early not only in the internal combustion engine that includes both of the port injector and the in-cylinder injector, such as the internal combustion engine 1, but also in the in-cylinder injection internal combustion engine that includes, as the fuel injection means, only the in-cylinder injector for injecting the fuel directly into the combustion chamber.

Figure 4:
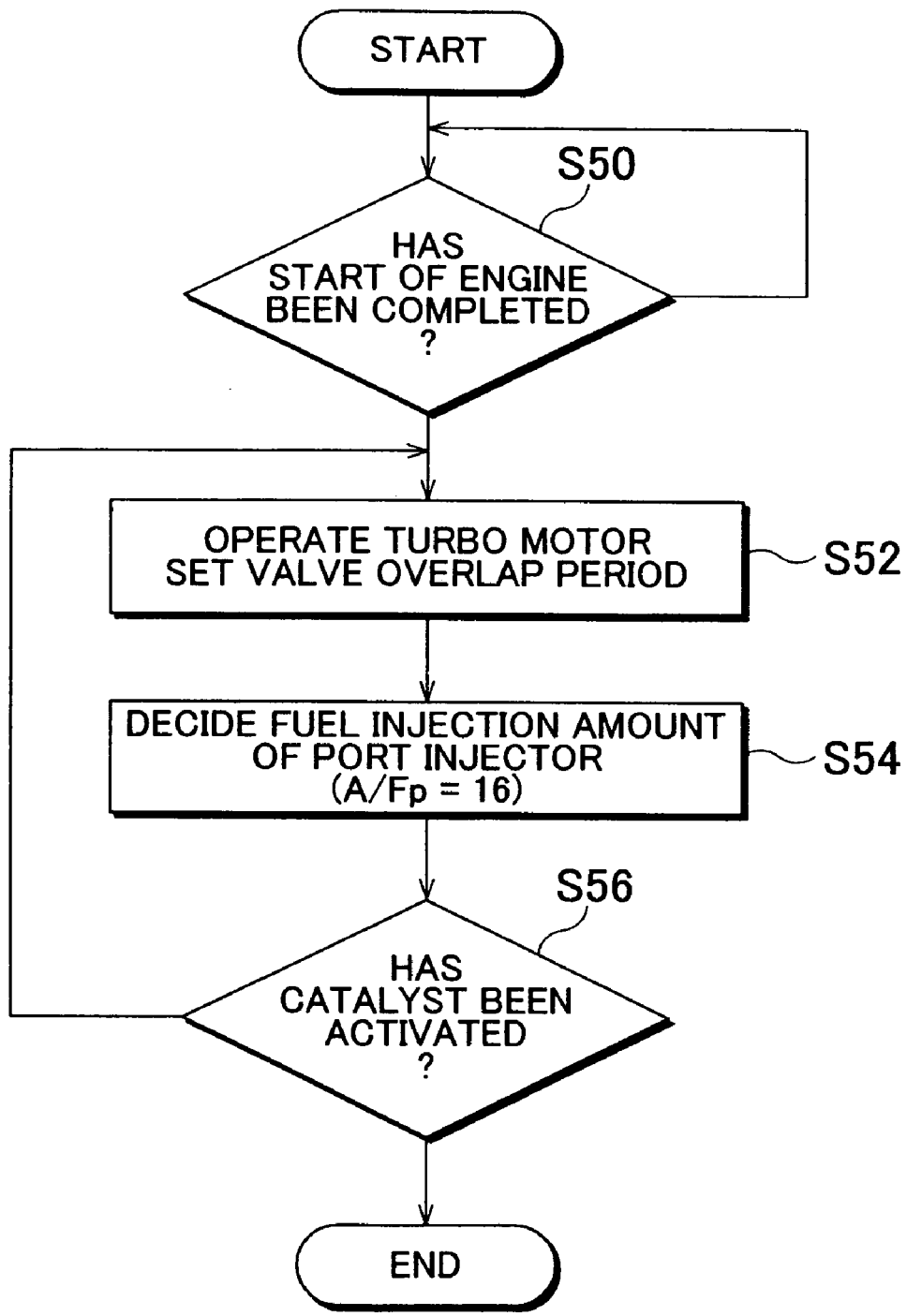
FIG. 4 is a flow chart showing a yet another control procedure that can be performed in the internal combustion engine shown in FIG. 1 in order to reduce exhaust emissions immediately after the engine is started.

FIG. 4 is a flow chart showing yet another control procedure that can be performed in the internal combustion engine 1 in order to reduce exhaust emissions immediately after the engine is started.

Hereinafter, the control procedure for the internal combustion engine 1 shown in FIG. 4 will be described. In this case as well, when the ignition switch is turned on and the internal combustion engine 1 is started, the ECU 50 determines that the start of the internal combustion engine 1 has been completed when the engine rotational speed obtained based on the signal from the crank angle sensor 19 becomes higher than the predetermined threshold value (S50). When the ECU 50 determines that the start of the internal combustion engine 1 has been completed, the ECU 50 operates the turbo motor 24 for the turbocharger 20, and sets the overlap period during which both of the intake valve Vi and the exhaust valve Ve for each combustion chamber 2 are opened (S52).

In step S52, the ECU 50 gives a predetermined command signal to the inverter unit 25 connected to the turbo motor 24 such that the intake air pressure detected by the pressure sensor 16 becomes higher than the back pressure inherent in the internal combustion engine 1. At substantially the same time, the ECU 50 sets the overlap period during which both of the intake valve Vi and the exhaust valve Ve are opened, according to the map and the like that are made in advance, and gives a predetermined command signal to the valve drive mechanism 8 including the variable valve timing mechanism.

After the process in step S52 is performed, the ECU 50 decides the fuel injection amount of each port injector 10p (S54). More specifically, in step S54, the ECU 50 decides the valve opening period of each port injector 10p such that the air-fuel ratio A/Fp of the air-fuel mixture in each intake port 4 becomes, for example, approximately 16 (A/Fp=16), based on the intake air pressure set in step S52 according to the map that is made in advance and the like, and gives a predetermined command signal to each port injector 10p.

Thus, when the process in step S54 has been completed, each port injector 10p injects the fuel into each intake port 4 (i.e., performs synchronous injection) such that the air-fuel ratio of the air-fuel mixture in each intake port 4 becomes lean (A/Fp =16). As a result, the air-fuel ratio A/Fe of the air-fuel mixture in each exhaust port 5 is maintained at approximately 16 at which burning of the air-fuel mixture can be promoted easily, due to blow-by of the lean air-fuel mixture whose air-fuel ratio A/Fp is approximately 16 from the intake port 4 to the exhaust port 5.

Further, after the process in step S54 is performed, the ECU 50 obtains the catalyst bed temperature based on the signal from the temperature sensor 18 in the catalyst device 17, and determines whether the obtained catalyst bed temperature is higher than the predetermined threshold value (S56). When the ECU 50 determines that the catalyst bed temperature is higher than the threshold value, and therefore determines that the catalyst of the catalyst device 17 has been fully activated in step S56, The ECU 50 terminates a series of the processes in FIG. 4, and starts the control for the internal combustion engine 1 that is performed during normal operation. Meanwhile, when the ECU 50 determines that the catalyst bed temperature is equal to or lower than the predetermined threshold value in step S56, the ECU 50 repeatedly performs the aforementioned processes in step S52 to S54.

As described above, in the case where the processes shown in FIG. 4 are performed as well, the valve overlap period during which both of the intake valve Vi and the exhaust valve Ve are opened is set while the pressure of the air taken into each combustion chamber 2 (intake air pressure) is set to a value larger than the back pressure until it is determined that the catalyst of the catalyst device 17 has been activated in step S56, for example, immediately after the engine is started. Thus, it is possible to reliably promote blow-by of the lean air-fuel mixture (A/Fp=16), which is generated by uniformly mixing the air and the fuel in each intake port 4, from the intake port 4 to the exhaust port 5. Accordingly, a sufficient amount of air (oxygen) can be delivered to the catalyst together with unburned fuel. Also, in the case where the control procedure shown in FIG. 4 is employed, since the air-fuel ratio A/Fc of the air-fuel mixture in each combustion chamber 2 is maintained at approximately 16, the combustion temperature of the air-fuel mixture in each combustion chamber 2 is increased, and therefore the temperature of exhaust gas discharged from each combustion chamber 2 can be increased.

As a result, in the case where the control procedure shown in FIG. 4 is employed as well, since after-burning of the fuel in the catalyst of the catalyst device 17 can be promoted, and the temperature of exhaust gas can be increased, the catalyst can be activated rapidly immediately after the engine is started, and exhaust emissions can be suitably reduced. Also, in the case where the control procedure shown in FIG. 4 is employed, it is possible to suppress occurrence of excessive torque due to supply of an excessive amount of fuel to each combustion chamber 2 immediately after the engine is started. Also, in this case as well, the air pump and the like which are conventionally used for supplying secondary air to the catalyst in order to activate the catalyst become unnecessary. Further, if a difference between the intake air pressure set in step S52 and the back pressure is made sufficiently large, the influence of heat loss of the exhaust gas at the turbocharger 20 on activation of the catalyst is substantially negligible.

After the air-fuel ratio in each intake port 4 is appropriately set in step S54 in FIG. 4, each port injector 10p may perform non-synchronous injection into each intake port 4 between step S54 and step S56 such that the air-fuel ratio A/Fe of the air-fuel mixture in each exhaust port 5 is maintained at, for example, approximately 16. In this case, for example, the air-fuel ratio A/Fp in each intake port 4 is set to approximately 18 (A/Fp=18) in step S54, and the air-fuel ratio A/Fp in each intake port 4 at the time of the non-synchronous injection is set to approximately 14 (A/Fp=14).

As described above, in the case where the control procedure shown in FIG. 4 is employed, it is possible to obtain substantially the same effects as those obtained in the case where the control procedure shown in FIG. 2 is employed. That is, according to the invention, the catalyst can be activated early not only in the internal combustion engine that includes both of the port injector and the in-cylinder injector, such as the internal combustion engine 1, but also in the port injection internal combustion engine that includes, as the fuel injection means, only the port injector for injecting the fuel into the intake port.

What is claimed is:

1. An internal combustion engine in which power is generated by burning a mixture of fuel supplied from a fuel injection device and air in a combustion chamber continuous with an intake port that is opened/closed by an intake valve and an exhaust port that is opened/closed by an exhaust valve, comprising:
   a valve opening characteristic setting device which changes a valve opening characteristic of at least one of the intake valve and the exhaust valve;
   a turbocharger which supercharges air taken into the combustion chamber;
   a supercharging pressure setting device which changes supercharging pressure generated by the turbocharger;
   a catalyst which purifies exhaust gas discharged from the combustion chamber; and
   a controller which controls the supercharging pressure setting device such that pressure of the air taken into the combustion chamber becomes larger than back pressure until it is determined that the catalyst has been activated, and which sets a valve overlap period during which both of the intake valve and the exhaust valve are opened,
   wherein the fuel injection device includes a port injector for injecting the fuel into the intake port, and an in-cylinder injector for injecting the fuel directly into the combustion chamber, and the controller causes the port injector to inject the fuel such that an air-fuel ratio of the mixture in the intake port becomes lean and causes the in-cylinder injector to inject the fuel until it is determined that the catalyst has been activated.

2. The internal combustion engine according to claim 1, wherein the turbocharger includes a motor which is the supercharging pressure setting device, and which rotates a compressor element.

3. The internal combustion engine according to claim 1, wherein the controller causes the in-cylinder injector to inject the fuel also during an exhaust stroke until it is determined that the catalyst has been activated.

4. A control method for an internal combustion engine including a combustion chamber continuous with an intake port that is opened/closed by an intake valve and an exhaust port that is opened/closed by an exhaust valve; a valve opening characteristic setting device which changes a valve opening characteristic of at least one of the intake valve and the exhaust valve; a turbocharger which can change a supercharging pressure; and a catalyst which purifies exhaust gas discharged from the combustion chamber, wherein power is generated by burning a mixture of fuel supplied from a fuel injection device and air in the combustion chamber, the control method comprising:
   setting pressure of air supercharged by the turbocharger and taken into the combustion chamber to a value larger than back pressure until it is determined that the catalyst has been activated; and
   setting a valve overlap period during which both of the intake valve and the exhaust valve are opened,
   wherein the fuel injection device includes a port injector for injecting the fuel into the intake port, and an in-cylinder injector for injecting the fuel directly into the combustion chamber, and the port injector is controlled to inject the fuel such that an air-fuel ratio of the mixture in the intake port becomes lean and the in-cylinder injector is controlled to inject the fuel until it is determined that the catalyst has been activated.

5. An internal combustion engine in which power is generated by burning a mixture of fuel supplied from fuel injection means and air in a combustion chamber continuous with an intake port that is opened/closed by an intake valve and an exhaust port that is opened/closed by an exhaust valve, comprising:
   valve opening characteristic setting means for changing a valve opening characteristic of at least one of the intake valve and the exhaust valve;
   a turbocharger for supercharging air taken into the combustion chamber;
   supercharging pressure setting means for changing supercharging pressure generated by the turbocharger;
   a catalyst for purifying exhaust gas discharged from the combustion chamber; and
   control means for controlling the supercharging pressure setting means such that pressure of the air taken into the combustion chamber becomes larger than back pressure until it is determined that the catalyst has been activated, and setting a valve overlap period during which both of the intake valve and the exhaust valve are opened,
   wherein the fuel injection means includes a port injector for injecting the fuel into the intake port, and an in-cylinder injector for injecting the fuel directly into the combustion chamber; and the control means causes the port injector to inject the fuel such that an air-fuel ratio of the mixture in the intake port becomes lean and the in-cylinder injector to inject the fuel until it is determined that the catalyst has been activated.

6. A control method for an internal combustion engine including a combustion chamber continuous with an intake port that is opened/closed by an intake valve and an exhaust port that is opened/closed by an exhaust valve; valve opening characteristic setting means for changing a valve opening characteristic of at least one of the intake valve and the exhaust valve; a turbocharger which can change a supercharging pressure; and a catalyst for purifying exhaust gas discharged from the combustion chamber, wherein power is generated by burning a mixture of fuel supplied from fuel injection means and air in the combustion chamber, the control method comprising:
   setting pressure of air supercharged by the turbocharger and taken into the combustion chamber to a value larger than back pressure until it is determined that the catalyst has been activated; and setting a valve overlap period during which both of the intake valve and the exhaust valve are opened,
wherein the fuel injection means includes a port injector for injecting the fuel into the intake port, and an in-cylinder injector for injecting the fuel directly into the combustion chamber, and the port injector is controlled to inject the fuel such that an air-fuel ratio of the mixture in the intake port becomes lean and the in-cylinder injector is controlled to inject the fuel until it is determined that the catalyst has been activated.

* * * * *